United States Patent
Chou et al.

(10) Patent No.: US 8,826,078 B2
(45) Date of Patent: Sep. 2, 2014

(54) COMPUTER SYSTEM AND DIAGNOSTIC METHOD THEREOF

(75) Inventors: Le-Sheng Chou, Taoyuan County (TW); Wei-Yu Chien, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 402 days.

(21) Appl. No.: 13/364,351

(22) Filed: Feb. 2, 2012

(65) Prior Publication Data

US 2013/0031411 A1    Jan. 31, 2013

(30) Foreign Application Priority Data

Jul. 25, 2011    (TW) .............................. 100126233 A (51) Int. Cl.
*G06F 11/00*    (2006.01)
*G06F 11/22*    (2006.01)

(52) U.S. Cl.
CPC ........ *G06F 11/2294* (2013.01); *G06F 11/2284* (2013.01)
USPC ........................................................ 714/27

(58) Field of Classification Search
USPC ........................................................ 714/27
See application file for complete search history.

(56) References Cited

U.S. PATENT DOCUMENTS

| | | | |
|---|---|---|---|
| 6,163,849 A * | 12/2000 | Nouri et al. ................... | 713/324 |
| 6,772,376 B1 * | 8/2004 | Merkin et al. ................ | 714/48 |
| 2003/0005362 A1 * | 1/2003 | Miller et al. .................. | 714/27 |
| 2009/0204667 A1 * | 8/2009 | Diaz et al. .................... | 709/203 |
| 2010/0146346 A1 * | 6/2010 | Johnson et al. ............... | 714/48 |
| 2011/0016283 A1 * | 1/2011 | Davis et al. ................... | 711/170 |

FOREIGN PATENT DOCUMENTS

| | | |
|---|---|---|
| TW | 201104430 A | 2/2011 |
| TW | M400016 U | 3/2011 |

* cited by examiner

*Primary Examiner* — Bryce Bonzo
(74) *Attorney, Agent, or Firm* — Rabin & Berdo, P.C.

(57) ABSTRACT

A computer system and a diagnostic method thereof are provided. The computer system comprises a system management bus (SMBus) switch, a plurality of servers and a remote management controller (RMC). Each server comprises a diagnostic message port, a basic input output system (BIOS) and a logic circuit. The BIOS outputs a diagnostic message to the diagnostic message port. The logic circuit catches the diagnostic message. The RMC comprises a SMBus host controller. The SMBus host controller controls the SMBus switch to connect the SMBus host controller to a corresponding logic circuit according to a request. The logic circuit responds the diagnostic message to the SMBus host controller according to the request.

12 Claims, 8 Drawing Sheets

FIG. 9

COMPUTER SYSTEM AND DIAGNOSTIC METHOD THEREOF

This application claims the benefit of Taiwan application Serial No. 100126233, filed Jul. 25, 2011, the subject matter of which is incorporated herein by reference.

BACKGROUND OF THE INVENTION

1. Field of the Invention

The invention relates in general to a computer, and more particularly to a computer system and a diagnostic method thereof.

2. Description of the Related Art

Figure 1:
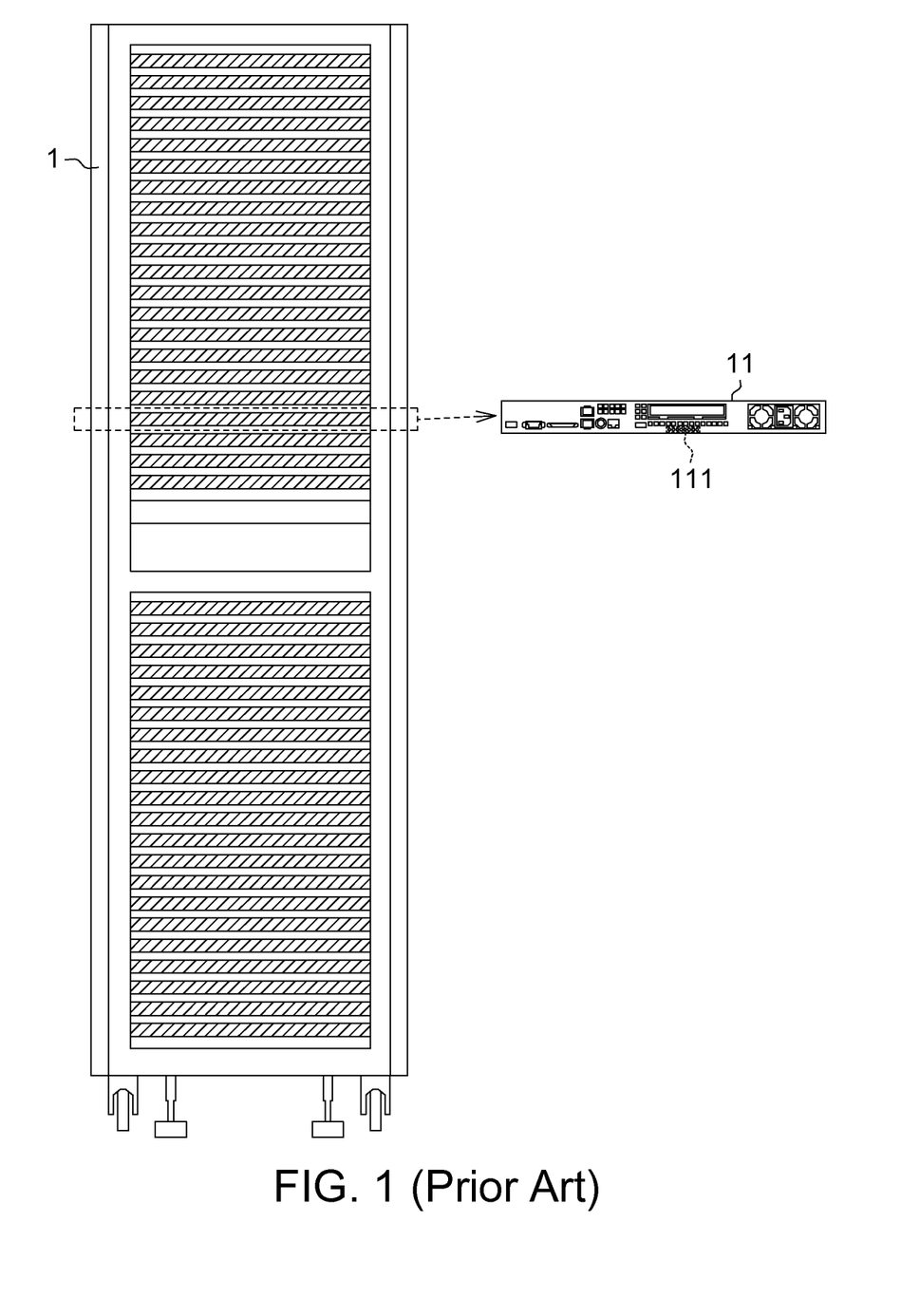
FIG. 1 shows a rack server.

Referring to FIG. 1, a rack server is shown. For the maintenance personnel to understand whether the starting up procedure of each server is complete and established, the server motherboard 11 of a conventional rack server 1 is normally equipped with various forms of debug diagnostic devices. The simplest type of debug diagnostic device relies on the power-on self test (POST) debug diagnostic message provided by the conventional I/O port 80H of the server motherboard 11.

The server motherboard 11 displays the current initialization stage of various hardware of the server motherboard 111 performed by the basic input output system (BIOS) or the hardware/software error detected during the starting-up process with eight light emitting diodes 111. The displayed messages provide server service reference for the maintenance personnel.

Currently, a rack server 1 normally carries more than 40 servers. It is indeed inconvenient and time consuming for the maintenance personnel to check the power-on states of all servers and check the debug diagnostic message one by one. The maintenance personnel may even have to step on a ladder in order to reach the servers installed at the top of the rack server 1.

SUMMARY OF THE INVENTION

The invention is directed to a computer system and a diagnostic method thereof.

According to one embodiment of the present invention, a computer system is provided. The computer system comprises a system management bus (SMBus) switch, a plurality of servers and a remote management controller (RMC). Each server comprises a diagnostic message port, a basic input output system (BIOS) and a logic circuit. The BIOS outputs a diagnostic message to the diagnostic message port. The logic circuit catches the diagnostic message. The RMC comprises a SMBus host controller. The SMBus host controller controls the SMBus switch to connect the SMBus host controller to a corresponding logic circuit according to a request. The logic circuit responds the diagnostic message to the SMBus host controller according to the request.

According to another embodiment of the present invention, a diagnostic method of a computer system is provided. The computer system comprises a plurality of servers, a remote management controller (RMC) and a system management bus (SMBus) switch. Each server comprises a diagnostic message port, a BIOS and a logic circuit. The RMC comprises a system management bus (SMBus) host controller. The diagnostic method comprises: outputting a diagnostic message to the diagnostic message port by the BIOS; catching the diagnostic message by the logic circuit; controlling the SMBus switch to connect the SMBus host controller to a corresponding logic circuit by the SMBus host controller according to a request; and responding the diagnostic message to the SMBus host controller by the logic circuit according to the request.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 2:
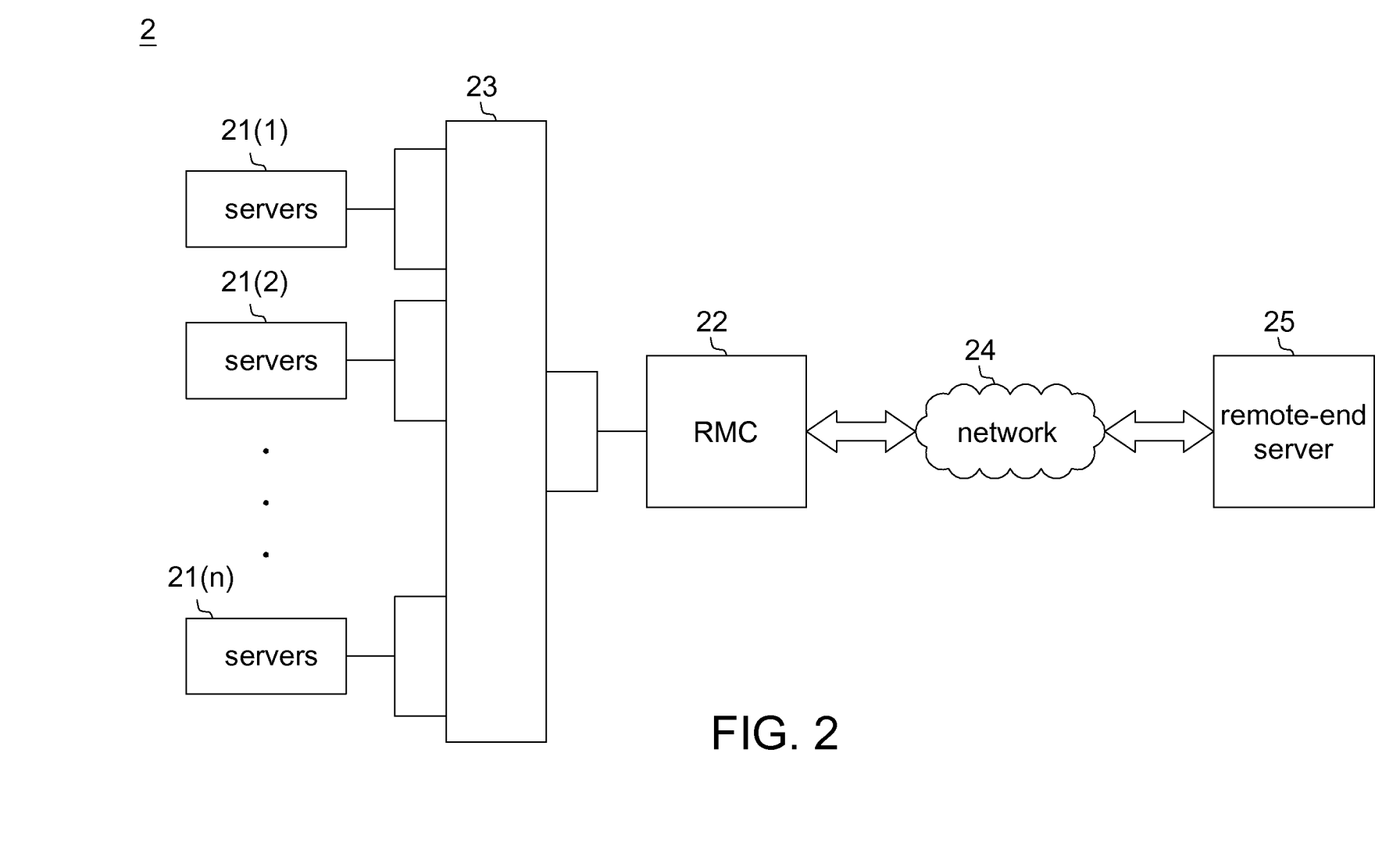
FIG. 2 shows a computer system according to the invention.
Figure 3:
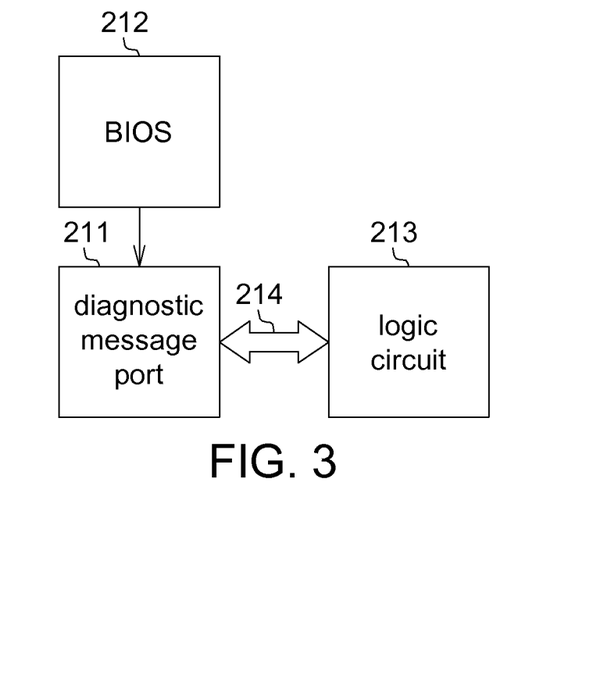
FIG. 3 shows a server.
Figure 4:
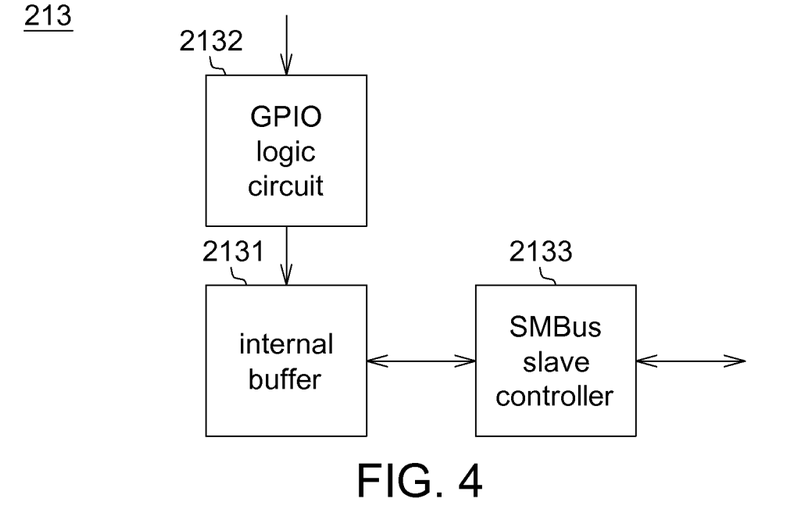
FIG. 4 shows a logic circuit.
Figure 5:
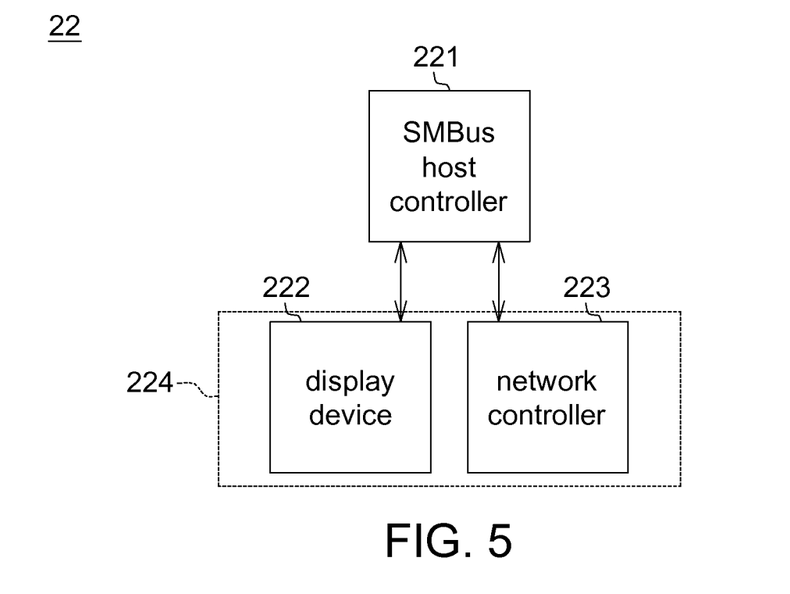
FIG. 5 shows an RMC.

Referring to FIG. 2 to FIG. 5. FIG. 2 shows a computer system according to the invention. FIG. 3 shows a server. FIG. 4 shows a logic circuit. FIG. 5 shows an RMC. The computer system 2 comprises a plurality of servers 21(1)~21(n), a remote management controller (RMC) 22 and a system management bus (SMBus) switch 23, wherein, n is a positive integer larger than 1, and the servers 21(1)~21(n) are such as rack servers. Each of the servers 21(1)~21(n) comprises a diagnostic message port 211, a basic input output system (BIOS) 212, a logic circuit 213 and a low pin count (LPC) bus 214. The LPC bus 214 connects the logic circuit 213 and the diagnostic message port 211. The BIOS 212 outputs a diagnostic message to the diagnostic message port 211. The logic circuit 213 catches the diagnostic message from the diagnostic message port 211. The diagnostic message port 211 is realized by such as an I/O port 80H. The diagnostic message is generated from the power-on self test (POST) performed by the BIOS 212.

The logic circuit 213 further comprises an internal buffer 2131, a general purpose I/O (GPIO) logic circuit 2132 and a SMBus slave controller 2133. The general purpose I/O (GPIO) logic stores the diagnostic message to the internal buffer 2131. The SMBus slave controller 2133 locates a corresponding diagnostic message from the internal buffer 2131 and outputs the diagnostic message to the SMBus host controller 221 according to the request.

The RMC 22 comprises a system management bus (SMBus) host controller 221 and a diagnostic message center 224. The diagnostic message center outputs a request to the SMBus host controller 221, and the SMBus host controller 221 outputs a diagnostic message to the diagnostic message center 224. The diagnostic message center 224 comprises a display device 222 and a network controller 223, which are coupled to the SMBus host controller 221. The SMBus host controller 221 such as controls the SMBus switch 23 to connect the SMBus host controller 221 to the corresponding logic circuit 213 according to the request generated by the display device 222 or the network controller 223. The logic circuit 213 responds the diagnostic message to the SMBus host controller according to the request 221.

In addition, the network controller 223 can further be coupled to the remote-end server 25 via a network 24. Thus, the administrator can understand whether the starting up procedures of the servers 21(1)~21(n) are complete or established, and can obtain the states and error messages of the servers 21(1)~21(n) through the remote-end management device, so as to decrease maintenance time and increase management efficiency.

Figure 6:
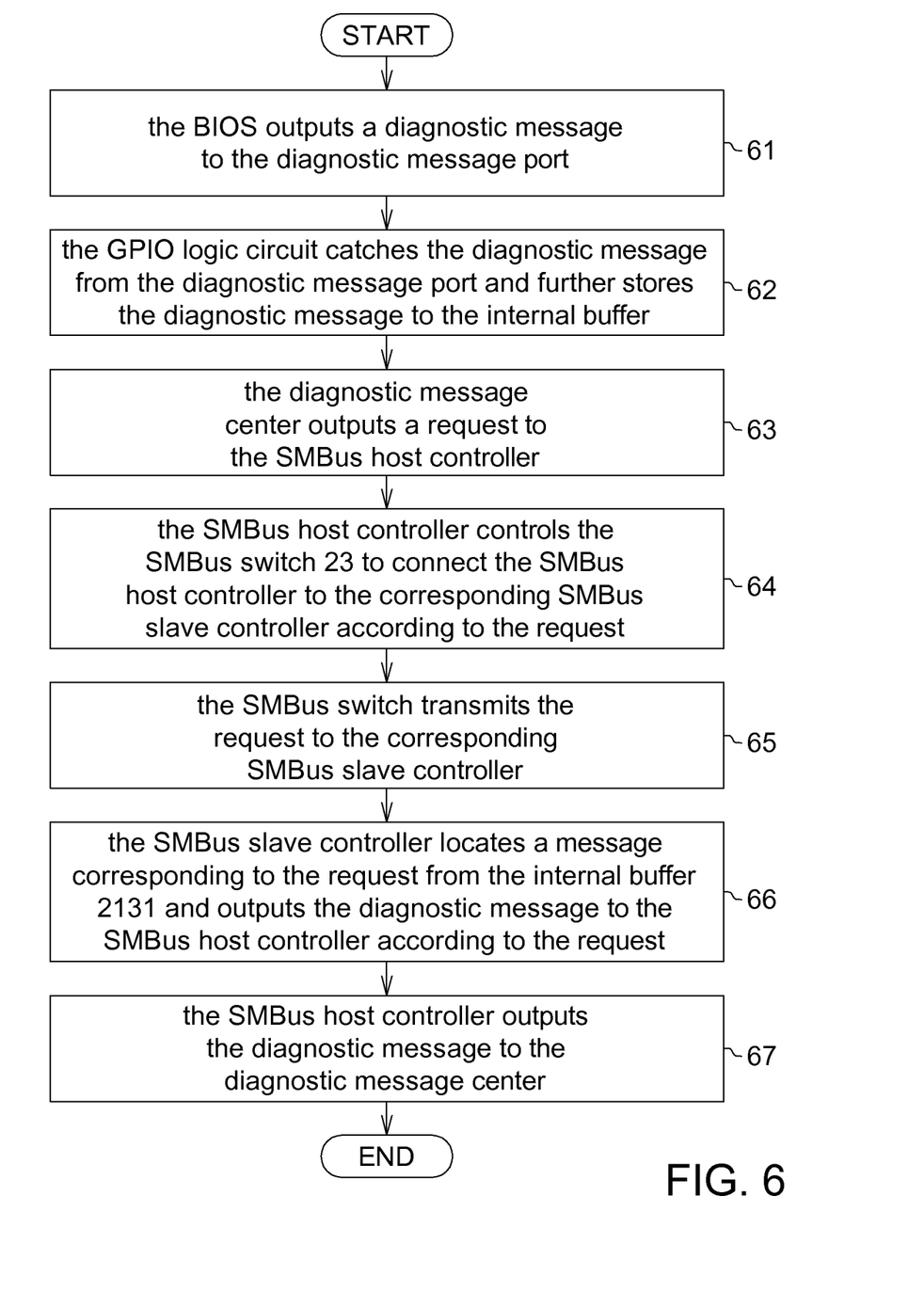
FIG. 6 shows a flowchart of a diagnostic method according to the invention.

Referring to FIG. 2 to FIG. 6. FIG. 6 shows a flowchart of a diagnostic method according to the invention. The diagnostic method can be used in the computer system 2, and comprises the following steps: Firstly, the method begins at step 61, the BIOS 212 performs power-on self test and outputs a diagnostic message to the diagnostic message port 211. Then, the method proceeds to step 62, the GPIO logic circuit 2132 catches the diagnostic message from the diagnostic message port 211 and further stores the diagnostic message to the internal buffer 2131. Then, the method proceeds to step 63, the diagnostic message center 224 outputs a request to the SMBus host controller 221, wherein the request is generated by such as the display device 222 or the network controller 223.

Then, the method proceeds to step 64, the SMBus host controller 221 controls the SMBus switch 23 to connect the SMBus host controller 221 to the corresponding SMBus slave controller 2133 according to the request. Then, the method proceeds to step 65, the SMBus switch 23 transmits the request to the corresponding SMBus slave controller 2133. Then, the method proceeds to step 66, the SMBus slave controller 2133 locates a diagnostic message corresponding to the request from the internal buffer 2131 and outputs the diagnostic message to the SMBus host controller 221 according to the request. Then, the method proceeds to step 67, the SMBus host controller 221 outputs the diagnostic message to the diagnostic message center 224.

Figure 7:
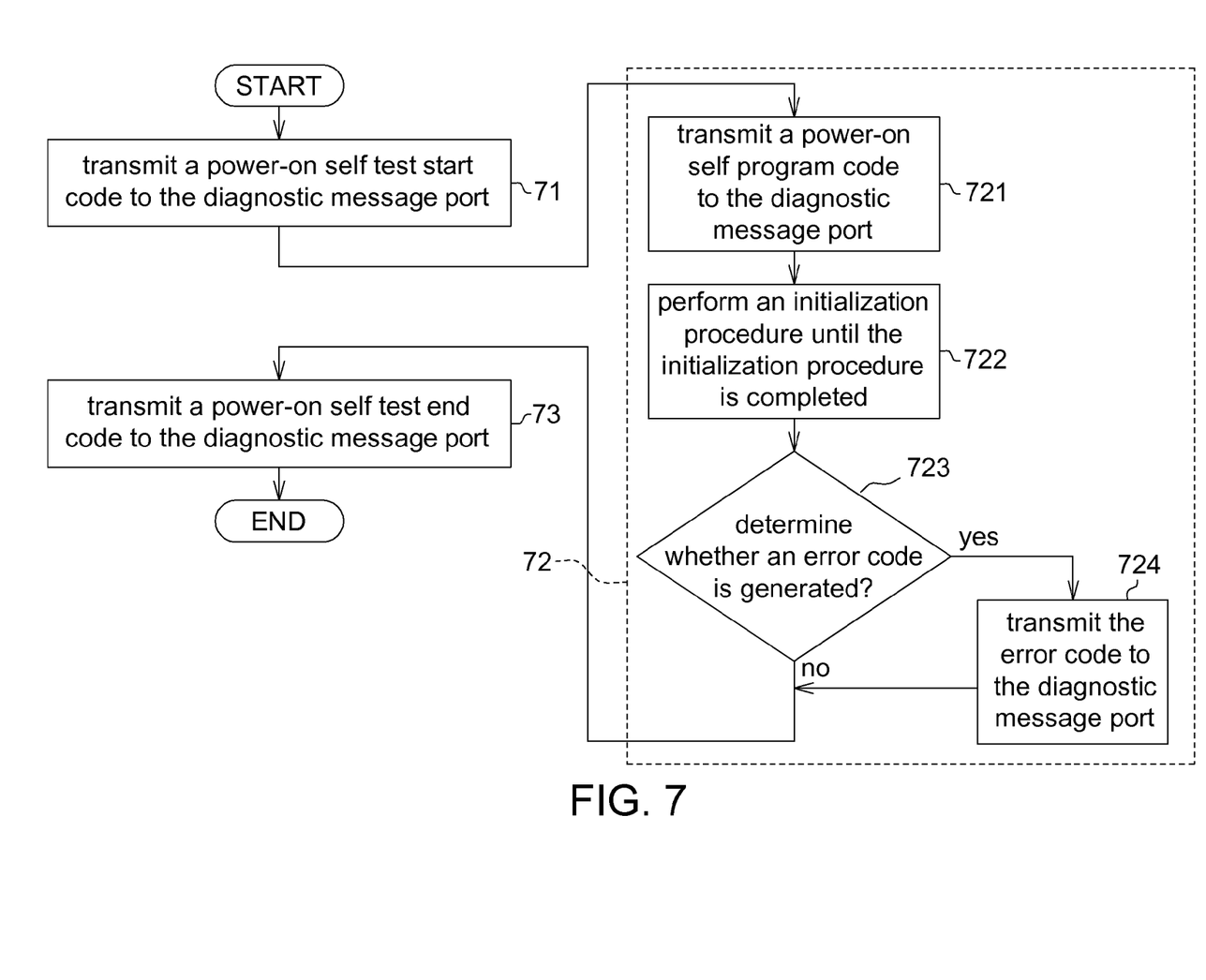
FIG. 7 shows a flowchart of a starting-up procedure of a BIOS.

Referring to FIG. 7. FIG. 7 shows a flowchart of a starting-up procedure of a BIOS. The BIOS starting-up procedure comprises the following steps: Firstly, the method begins at step 71, after the servers 21(1)~21(n) are turned on, the BIOS 212 transmits a power-on self test start code to the diagnostic message port 211. Next, the method proceeds to step 72, various hardware elements of the servers 21(1)~21(n) are initialized. It is noted that the hardware elements of the servers 21(1)~21(n) comprise central processor, memory, hard disc or network card, and step 72 is repeatedly performed until the initialization of various hardware elements of the servers is completed. Step 72 further comprises sub-steps 721~725. In step 721, the BIOS 212 transmits a power-on self program code to the diagnostic message port 211. Then, the method proceeds to step 722, the BIOS 212 performs an initialization procedure until the initialization procedure is completed. Then, the method proceeds to step 723, the BIOS 212 determines whether an error code is generated. If an error code is generated, then the method proceeds to step 724, the BIOS 212 transmits the error code to the diagnostic message port 211. Then, the method proceeds to step 73, the BIOS 212 transmits a power-on self test end code to the diagnostic message port 211.

Figure 8:
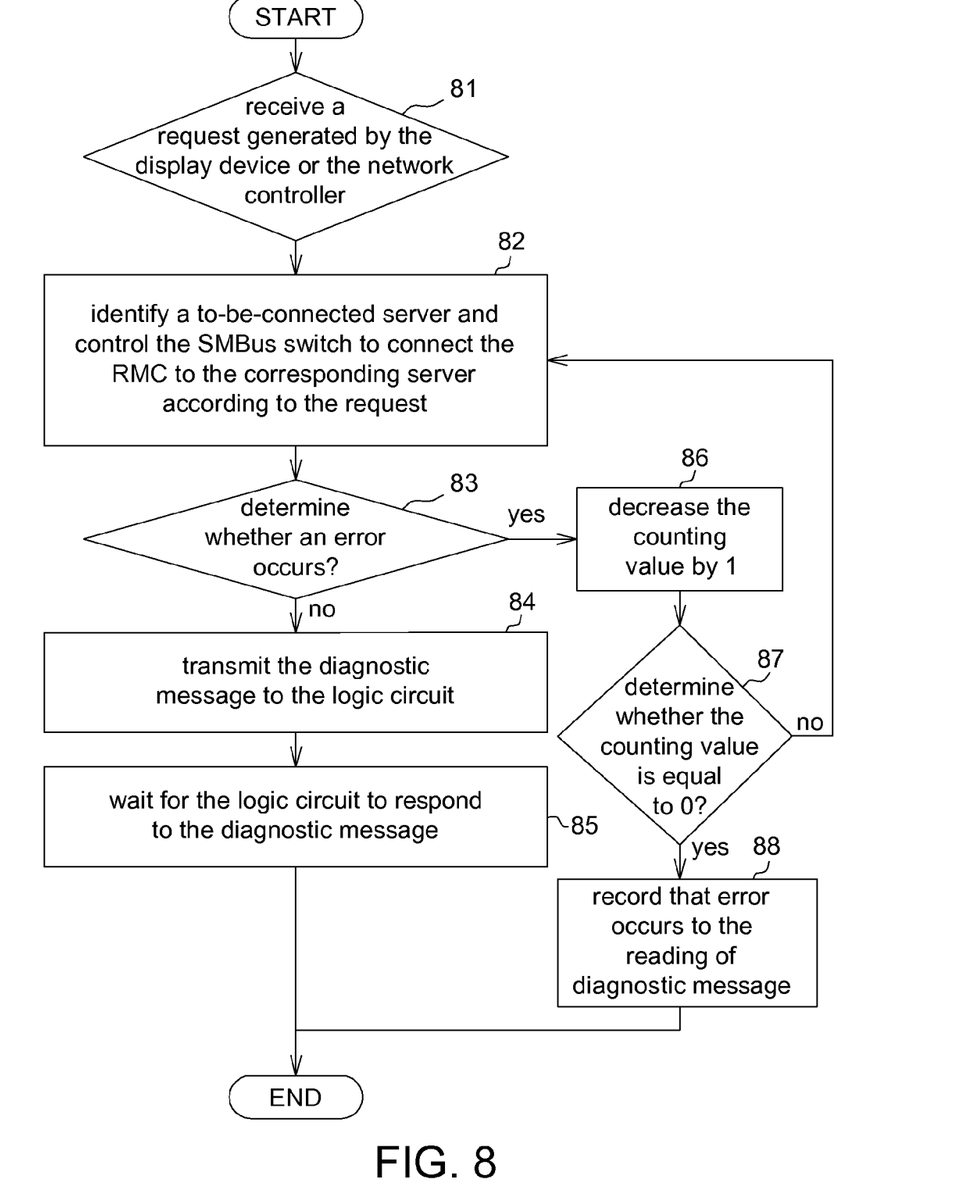
FIG. 8 shows a flowchart of a starting-up procedure of an RMC.

Referring to FIG. 8, a flowchart of a starting-up procedure of an RMC is shown. Firstly, the method begins at step 81, the RMC 22 receives a request generated by the display device 222 or the network controller 223. Then, the method proceeds to step 82, the RMC 22 identifies a to-be-connected server, and controls the SMBus switch 23 to connect the RMC 22 to the corresponding server according to the request.

Then, the method proceeds to step 83, the RMC 22 determines whether an error occurs. If no error occurs, the method proceeds to step 84, the RMC 22 transmits the diagnostic message to the logic circuit 213. Then, the method proceeds to step 85, the RMC 22 waits for the logic circuit 213 to respond to the diagnostic message. If an error occurs, then the method proceeds to step 86, a counting value is decreased by 1. Then, the method proceeds to step 87, the RMC 22 determines whether the counting value is equal to 0. If the counting value is not equal to 0, then step 82 is repeated. To the contrary, if the counting value is equal to 0, then the method proceeds to step 88, the RMC 22 records that error occurs to the reading of diagnostic message.

Figure 9:
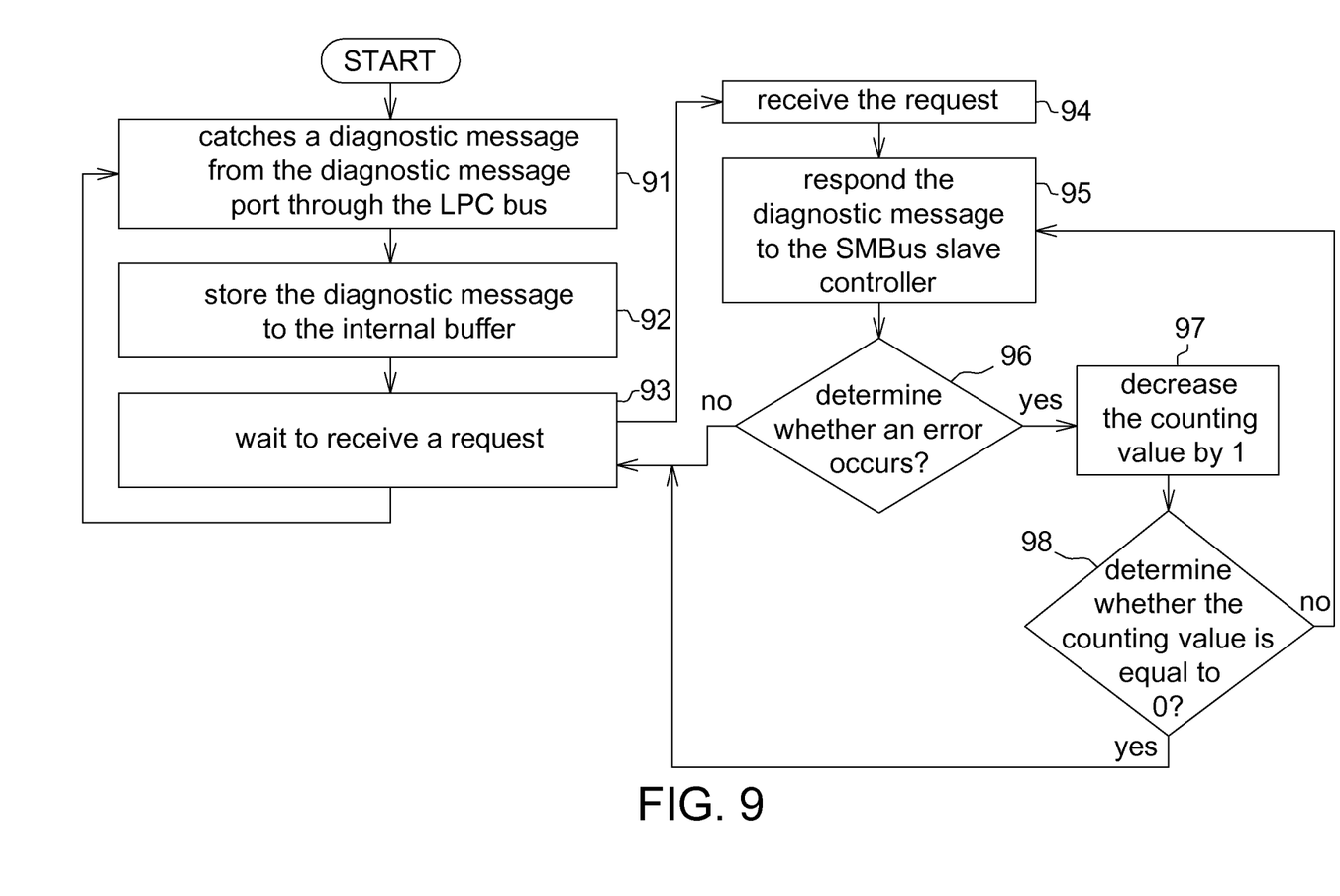
FIG. 9 shows a flowchart of a starting-up procedure of a logic circuit.

Referring to FIG. 9, a flowchart of a starting-up procedure of a logic circuit is shown. Firstly, the method begins at step 91, the general purpose I/O (GPIO) logic circuit 2132 catches a diagnostic message from the diagnostic message port 211 through the LPC bus 214. Then, the method proceeds to step 92, the GPIO logic circuit 2132 stores the diagnostic message to the internal buffer 2131. Then, the method proceeds to step 93, the GPIO logic circuit 2132 waits to receive a request. Then, the method proceeds to step 94, the SMBus slave controller 2133 receives the request. Then, the method proceeds to step 95, the GPIO logic circuit 2132 responds the diagnostic message to the SMBus slave controller 2133. Then, the method proceeds to step 96, the GPIO logic circuit 2132 determines whether an error occurs. If an error occurs, then the method proceeds to step 97, a counting value is progressively decreased. Then, the method proceeds to step 98, the GPIO logic circuit 2132 determines whether the counting value is equal to 0. If the counting value is not equal to 0, then step 95 is repeated. To the contrary, if the counting value is equal to 0, then step 93 is repeated.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer system, comprising:
   a system management bus (SMBus) switch;
   a plurality of servers, each comprising:
      a diagnostic message port;
      a basic input output system (BIOS), which outputs a diagnostic message to the diagnostic message port; and
      a logic circuit, which catches the diagnostic message; and
   a remote management controller (RMC), comprising:
      a system management bus (SMBus) host controller, which controls the SMBus switch to connect the SMBus host controller to the corresponding logic circuit according to a request, wherein the logic circuit responds the diagnostic message to the SMBus host controller according to the request.

2. The computer system according to claim 1, wherein the logic circuit comprises:
   an internal buffer;
   a general purpose I/O (GPIO) logic, which stores the diagnostic message to the internal buffer; and
   a SMBus slave controller, which locates the corresponding diagnostic message from the internal buffer according to the request and outputs a diagnostic message to the SMBus host controller.

3. The computer system according to claim 2, wherein the RMC further comprises:

a diagnostic message center, which outputs a request to the SMBus host controller, wherein the SMBus host controller outputs a diagnostic message to the diagnostic message center.

4. The computer system according to claim 3, wherein the diagnostic message center comprises:
a display device coupled to the SMBus host controller; and
a network controller coupled to the SMBus host controller.

5. The computer system according to claim 4, wherein the network controller is coupled to a remote-end server via a network.

6. The computer system according to claim 1, wherein each server further comprises:
a low pin count (LPC) bus, which connects the logic circuit and the diagnostic message port.

7. A diagnostic method of a computer system, wherein the computer system comprises a plurality of servers, a remote management controller (RMC) and a system management bus (SMBus) switch, each server comprises a diagnostic message port, a BIOS and a logic circuit, the RMC comprises a system management bus (SMBus) host controller, and the diagnostic method comprises:
outputting a diagnostic message to the diagnostic message port by the BIOS;
catching the diagnostic message by the logic circuit;
controlling the SMBus switch to connect the SMBus host controller to the corresponding logic circuit by the SMBus host controller according to a request; and
responding the diagnostic message to the SMBus host controller by the logic circuit according to the request.

8. The diagnostic method according to claim 7, wherein the logic circuit comprises:
an internal buffer;
a general purpose I/O (GPIO) logic, which stores the diagnostic message to the internal buffer; and
a SMBus slave controller, which locates the corresponding diagnostic message from the internal buffer according to the request and outputs a diagnostic message to the SMBus host controller.

9. The diagnostic method according to claim 8, wherein the RMC further comprises:
a diagnostic message center, which outputs a request to the SMBus host controller, wherein the SMBus host controller outputs a diagnostic message to the diagnostic message center.

10. The diagnostic method according to claim 9, wherein the diagnostic message center comprises:
a display device coupled to the SMBus host controller; and
a network controller coupled to the SMBus host controller.

11. The diagnostic method according to claim 10, wherein the network controller is coupled to a remote-end server via a network.

12. The diagnostic method according to claim 7, wherein each server further comprises:
a low pin count (LPC) bus, which connects the logic circuit and the diagnostic message port.

\* \* \* \* \*